May 29, 1928.
W. E. SNAMAN
AIR FILTER
Filed June 24, 1926
1,671,383
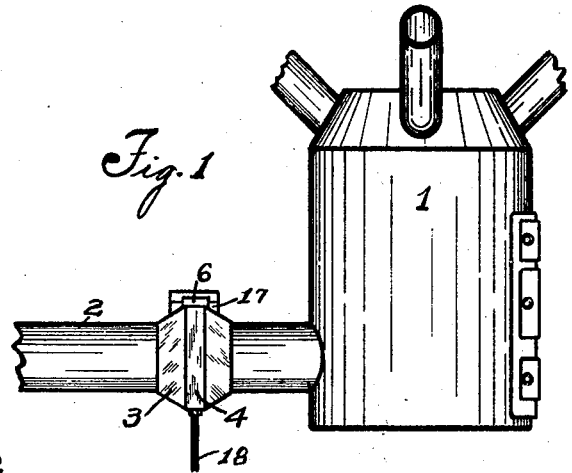
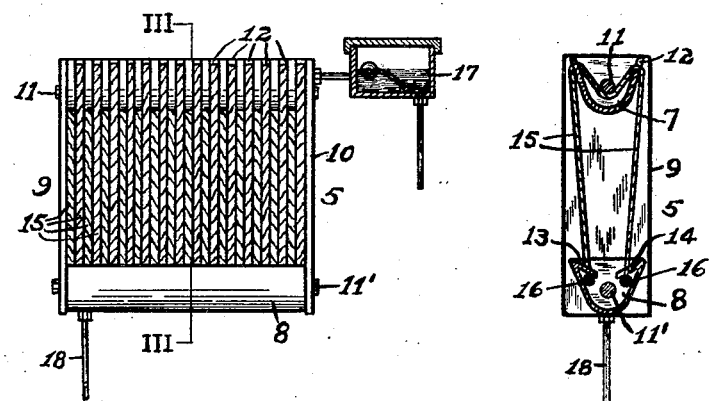
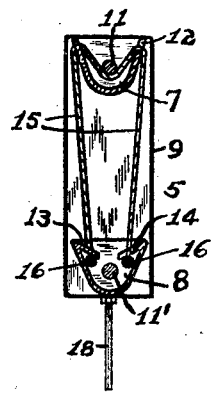
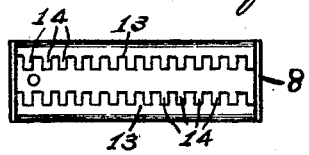
INVENTOR
William E. Snaman
By Jas R. Snyder
attorney Patented May 29, 1928.

1,671,383

UNITED STATES PATENT OFFICE.

WILLIAM EDWARD SNAMAN, OF PITTSBURGH, PENNSYLVANIA.

AIR FILTER.

Application filed June 24, 1926. Serial No. 118,195.

My invention relates to an air filter and while primarily intended for use in connection with heating systems, particularly of the hot-air type, it is to be understood that the filter may be embodied and utilized in any other device wherein it is found to be applicable.

The primary object of the invention is to provide a filtering apparatus for hot-air heating systems, which will remove all impurities from the air before the latter is circulated through the dwelling by the operation of the furnace, while simultaneously establishing the proper humidity of the filtered air, essential to health.

Further objects of the invention are to provide a device of the type stated, which may be readily installed in an erected furnace structure, or embodied in the manufacture of the latter, which is simple in its construction and arrangement, durable and efficient in its use, positive in its action, automatically maintained in operation, and comparatively inexpensive to manufacture, install and operate.

To the accomplishment of these and such other objects as may hereinafter appear, the invention consists of the novel construction, combination and arrangement of parts hereinafter specifically described and illustrated in the accompanying drawing, wherein is shown an embodiment of the invention, but it is to be understood that changes, variations and modifications may be resorted to which come within the scope of the claims hereunto appended.

In the drawing wherein like numerals of reference designate corresponding parts throughout the several views:—

Figure 1 is a side elevation of a hot air heating furnace provided with my improved air filter mounted in the air intake pipe thereof.

Figure 2 is a side elevational view of the air filter.

Figure 3 is a sectional view on line III—III, Figure 2.

Figure 4 is a top plan view of the drip pan.

Referring in detail to the drawing 1 denotes a hot air heating furnace, of the usual construction and including the fresh air intake pipe 2.

An enlarged casing 3, formed with a centrally disposed, transversely extending, squared section 4, is permanently connected in the intake pipe 2.

My improved air filter 5 is rectangular in contour and is adapted to be removably mounted in the casing section 4. The latter is formed with an open top provided with a suitable cover 6 to facilitate the mounting of the filter 5 therein, or its removal therefrom when required.

The air filter 5 comprises a horizontally disposed moisture supply reservoir 7 and a drip pan 8, both of which have an open top and are substantially U-shaped in transverse cross section. The reservoir 7 and the pan 8 are permanently connected together by respective end plates, indicated at 9 and 10. The reservoir 7 is disposed at the upper ends of the end plates 9 and 10 and is fixed in position by a horizontally disposed tie rod 11, which extends longitudinally through the reservoir 8, adjacent to the bottom thereof, and has its ends fixed in respective end plates 9 and 10. The pan 8 is disposed at the lower ends of the end plates 9 and 10, and is fixed in position by a horizontally disposed tie rod 11' which extends longitudinally through the pan 8 and has its ends fixed in respective end plates 9 and 10.

The upper marginal edges of the reservoir side walls are formed with a plurality of regularly spaced open slots 12. The latter are equally spaced from each other in respective reservoir side walls, and the slots 12 in one of the reservoir side walls are arranged in staggered relation with respect to the slots 12 in the other of the reservoir side walls.

The top of each of the drip pan side walls is provided with an inwardly disposed downwardly inclined portion or flange 13, which is formed with a plurality of regularly spaced open slots 14, corresponding to the slots 12 formed in the side walls of the reservoir 7. The slots 14, formed in the inclined portions 13 of one of the pan side walls are arranged in staggered relation with respect to the slots 14 in the inclined portion of the other of the pan side walls.

A plurality of vertically disposed moisture conductors 15 depend from the reservoir 7 into the drip pan 8 and each of which constitutes a filtering element. The conductors 15 are constructed of pervious fibrous cords or other suitable material capable of absorbing moisture by capillary attraction and the passage of air. The conductors 15 are arranged in pairs and extend in two opposed rows which are disposed respectively on the front and rear sides of the reservoir 7. Each pair of the conductors 15 comprises a continuous length having its central portion engaged beneath the tie rod 11 and passes through respective slots 12 of respective reservoir side walls, as clearly shown in Figure 3, of the drawing. The lower ends of conductors 15 extend into respective slots 14 of respective drip pan inclined portions or flanges 13, and are provided with weights 16, which engage the under face of the latter and serve to maintain the conductors 15 properly tensioned.

The reservoir 7 carries a water supply which is preferably kept at a constant level therein by a float valve controlled water supply tank 17 connected with the reservoir 7 and with the main source of supply in the usual manner. As the upper portions of each pair of the conductors 15 are held adjacent to the bottom of the reservoir 7, by their engagement by the tie rod 11, they will, at all times, be submerged in the water supply carried in the reservoir 7.

The attachment of the conductors 15 with the angularly disposed drip pan side wall portions 13, in the manner stated, will cause the deflection of all drippings from the conductors 15 to the pan 8, which is drained by a pipe 18, adapted to be connected with the sewer.

As the slots 12 in the side walls of the reservoir 7 are staggered relatively to each other, and likewise the slots 14 in the drip pan portions or flanges 13, the conductors 15 constituting one of the rows will be in staggered relation with respect to the conductors 15 constituting the other row.

The width of each of the conductors 15 is greater than the clearance between adjacent conductors of the same row. This provision together with the staggered arrangement of the conductors of one row relatively to the conductors in the other row, will cause all of the fresh air passing through the filter 5 to contact with the permanently moist conductors 15, whereby dust and all other impurities of the air will be caught or collected by the conductors 15 and conveyed to the drip pan 8 and to the sewer. Further the moisture of the conductors 15 will establish proper humidity of the air passing through the filter rendering the latter pleasant and wholesome when heated and circulated through the dwelling by the operation of the associated furnace.

It will here be noted that the operation of my improved air filter requires no attention for its maintenance, as the water is kept at a constant level in the reservoir 7 by the automatic operation of the float valve controlled water supply tank 17, and is drained from the drip pan 8 to a sewer outlet.

From the foregoing description taken in connection with the accompanying drawing, the principle of construction and the method of operation will be readily apparent to those skilled in the art to which the invention appertains, and while describing what is now thought to be the best embodiment of the invention, it is to be understood that the device shown in the drawing is merely illustrative, and that various changes in the forms, proportions and minor details of construction may be resorted to which come within the scope of the claims hereunto appended, without departing from the principle or sacrificing any advantages of the invention.

What I claim is:

1. In an air filtering apparatus, a moisture supply reservoir, a drip pan positioned below the latter, a plurality of vertically disposed fibrous moisture conductors arranged to provide a series of opposed, spaced rows of filtering elements, the upper ends of said conductors being secured in said reservoir and the lower ends extending into said drip pan, the conductors of one row being disposed in staggered relation with respect to the conductors of an adjacent row, means for supplying water to said reservoir, means for draining said drip pan, and means carried by each of said conductors and coacting with the drip pan for tensioning the conductors.

2. An air filtering apparatus comprising a casing provided with an air inlet and an air discharge outlet, a moisture supply reservoir arranged within the casing, a drip pan positioned at the bottom of the casing, end plates connecting said reservoir with said pan, a plurality of vertically disposed fibrous moisture conductors arranged to provide opposed rows of filtering elements, the upper ends of said conductors being secured in said reservoir and the lower ends thereof being secured in said drip pan, the conductors of one row being disposed in staggered relation with respect to the conductors of an adjacent row, the width of each of said conductors being greater than the clearance between the conductors of the same row, means for supplying water to said reservoir, means for draining said drip pan, and means carried by each of said conductors and coacting with the drip pan for tensioning the conductors.

3. A filtering apparatus comprising a casing having an inlet and outlet, a water reservoir arranged in the upper portion of the casing and having notched side walls, a valved controlled water supply arranged exteriorly of the casing and communicating with said reservoir, filtering elements possessing a capillary characteristic seated in the notches of said side walls, and extending into said reservoir, means for securing said elements in the reservoir, a drip pan having notches for the passage of the lower ends of said elements thereinto, and weights carried by the lower ends of said elements and coacting with said pan for maintaining said elements under a state of tension.

4. A filtering apparatus comprising a casing having an inlet and outlet, a water reservoir arranged in the upper portion of the casing and having notched side walls, a valved controlled water supply arranged exteriorly of the casing and communicating with said reservoir, filtering elements possessing a capillary characteristic seated in the notches of said side walls, and extending into said reservoir, means for secuing said elements in the reservoir, a drip pan having notches for the passage of the lower ends of said elements thereinto, weights carried by the lower ends of said elements and coacting with said pan for maintaining said elements under a state of tension, said drip pan arranged within said casing and the notches in said pan formed in inwardly extending flanges at the top thereof.

In testimony whereof I affix my signature.

WILLIAM EDWARD SNAMAN.